(12) United States Patent
Patwardhan et al.

(10) Patent No.: US 8,355,336 B2
(45) Date of Patent: Jan. 15, 2013

(54) METHODS AND APPARATUS FOR FORMATTING HEADERS IN A COMMUNICATION FRAME

(75) Inventors: Ravindra Patwardhan, San Diego, CA (US); Anurag Vardhan, San Diego, CA (US); Fatih Ulupinar, San Diego, CA (US); Parag A. Agashe, San Diego, CA (US); Rajat Prakash, La Jolla, CA (US); Vanitha Kumar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 63 days.

(21) Appl. No.: 12/276,156

(22) Filed: Nov. 21, 2008

(65) Prior Publication Data

US 2009/0201948 A1    Aug. 13, 2009

Related U.S. Application Data

(60) Provisional application No. 61/028,480, filed on Feb. 13, 2008.

(51) Int. Cl.
   *H04J 3/24* (2006.01)
(52) U.S. Cl. ......... 370/252; 370/389; 370/465; 370/474
(58) Field of Classification Search .................. 370/230, 370/252, 254, 310, 389, 429, 465, 468–472, 370/474
   See application file for complete search history.

(56) References Cited

U.S. PATENT DOCUMENTS

| | | | | |
|---|---|---|---|---|
| 5,828,858 | A * | 10/1998 | Athanas et al. | 710/317 |
| 6,771,660 | B1 * | 8/2004 | Bourlas et al. | 370/466 |
| 7,236,483 | B2 * | 6/2007 | Yeom | 370/352 |
| 7,483,532 | B2 * | 1/2009 | Alkove et al. | 380/37 |
| 7,548,561 | B2 * | 6/2009 | Shvodian et al. | 370/473 |
| 2004/0184450 | A1 * | 9/2004 | Omran | 370/372 |
| 2005/0238016 | A1 | 10/2005 | Nishibayashi et al. | |
| 2006/0133379 | A1 * | 6/2006 | Krishnan et al. | 370/394 |
| 2006/0146868 | A1 | 7/2006 | Ginzburg | |
| 2007/0049196 | A1 | 3/2007 | Hillyard et al. | |

FOREIGN PATENT DOCUMENTS

| | | |
|---|---|---|
| JP | 2006246539 A | 9/2006 |
| WO | WO0074344 A1 | 12/2000 |
| WO | 6052085 | 5/2006 |

OTHER PUBLICATIONS

International Search Report. PCT/US2008/084545—International Search Authority—European Patent Office, Apr. 9, 2009.
Written Opinion, PCT/US2008/084545—International Search Authority—European Patent Office, Apr. 9, 2006.
European Search Report—EP11175814—Search Authority—The Hague—Aug. 11, 2011 (080847EPD1).
Taiwan Search Report—TW097146512—TIPO—May 15, 2012.

* cited by examiner

*Primary Examiner* — Yemane Mesfin
*Assistant Examiner* — Mon Cheri Davenport
(74) *Attorney, Agent, or Firm* — Stanton Braden

(57) ABSTRACT

Methods and apparatus for formatting headers for data packets within a communication frame for use in a wireless communication system are presented. Formatting headers includes determining the size of a wireless communication frame, and formatting the payloads and associated headers within the communication frame according to the determined size. This formatting includes placing headers at the beginning of the frame before the data packets corresponding to the headers to optimize processing of the headers at a receiver. Formatting may also include formatting the headers according to a first format within the frame when the determined frame size is below a predetermined size to optimize the size of the headers, and formatting according to a second format within the frame size of the data packet is equal to or greater than the predetermined size to optimize processing for frames having large data packets.

52 Claims, 10 Drawing Sheets

METHODS AND APPARATUS FOR FORMATTING HEADERS IN A COMMUNICATION FRAME

CLAIM OF PRIORITY UNDER 35 U.S.C. §119

The present application for patent claims priority to Provisional Application No. 61/028,480 entitled "METHODS AND APPARATUS FOR HEADER FORMAT BASED ON PACKET SIZE" filed Feb. 13, 2008, and assigned to the assignee hereof and hereby expressly incorporated by reference herein.

BACKGROUND

1. Field

The present disclosure generally relates to methods and apparatus for formatting a header in a communication frame, and more specifically to formatting headers within a communication frame to optimize the frame for either processing or header size.

2. Background

In particular wireless communication systems, signals are transmitted in a frame format. Within the frame format, information is packetized and formatted according to actual payload data to be communicated over the communication system and other overhead information that is used for communicating various other information particular to the communication system, such as information used for timing acquisition and decoding the frame, as examples. This overhead information is typically arranged into a header packet within the frames, and associated with a corresponding payload data packet to which the header information pertains.

In some types of communication having low data rate (and small packet sizes), such as Voice-over-IP (VoIP) for example, it is desirable to minimize the header overhead information in order to increase system capacity, such as supporting more VoIP calls in system). Additionally, it is noted that at the media access control (MAC) layers and higher, frames are organized such that the headers are formatted in order of processing immediately before their associated data packets or payloads. With communications having higher data rates and larger packet sizes, however, the header size naturally increases for processing of the larger packets at the receiver. Utilizing a typical format with headers organized for processing before each corresponding data packet that is favorable for low data rate communications, tends to slow processing of the larger packets and their larger headers at a receiver during high data rate communications. Accordingly, a need exists to accommodate both low data rate communications and high data rate communications in a communication system, while allowing a mechanism to improve the efficiency of header processing for high data rate communications.

SUMMARY

In an aspect, a method for formatting headers for data payloads within a wireless communication frame for use in a wireless communication system is disclosed. The method includes first determining the size of the wireless communication frame. After the size is determined, the method also includes formatting headers and corresponding data payloads according to a first format within the frame when the size of the frame is below a predetermined size and according to a second format within the frame when the size of the frame is equal to or greater than the predetermined size.

In another aspect, an apparatus for formatting headers for data payloads within a wireless communication frame for use in a wireless communication is disclosed. The apparatus includes at least one processor configured to determine the size of the wireless communication frame. The processor is also configured to format headers and corresponding data payloads according to a first format within the frame when the size of the frame is below a predetermined size and according to a second format within the frame when the size of the frame is equal to or greater than the predetermined size. The apparatus also includes a memory coupled to the at least one processor.

According to yet another aspect, an apparatus for formatting headers within a communication frame for use in a wireless communication system is disclosed. The apparatus include means for determining the size of the wireless communication frame. The apparatus also includes means for formatting headers and corresponding data payloads according to a first format within the frame when the size of the frame is below a predetermined size and according to a second format within the frame when the size of the frame is equal to or greater than the predetermined size.

According to still another aspect, a computer program product comprising a computer-readable medium is disclosed. The computer-readable medium includes code for causing a computer to determine the size of a wireless communication frame in a wireless communication system, and code for causing a computer to format headers and corresponding data payloads according to a first format within the frame when the size of the frame is below a predetermined size and according to a second format within the frame when the size of the frame is equal to or greater than the predetermined size.

According to yet a further aspect, another method for formatting a communication frame used in a communication system is disclosed. The method includes determining a size of one of the communication frame and at least one data payload in the wireless communication frame. The method also includes formatting the communication frame to include headers at the beginning of the frame prior to any corresponding data payloads in the frame when the determined size of one of the communication frame and the at least one data payload is above a predetermined threshold.

In still another aspect, an apparatus for formatting a communication frame used in a communication system includes at least one processor. The processor is configured to determine a size of one of the communication frame and at least one data payload in the wireless communication frame. The process is also configured to format the communication frame to include headers at the beginning of the frame prior to any corresponding data payloads in the frame when the determined size of one of the communication frame and the at least one data payload is above a predetermined threshold. The apparatus also includes a memory coupled to the at least one processor.

In yet a further aspect, an apparatus for formatting a communication frame used in a communication system is disclosed. The apparatus includes means for determining a size of one of the communication frame and at least one data payload in the wireless communication frame. The apparatus also includes means for formatting the communication frame to include headers at the beginning of the frame prior to any corresponding data payloads in the frame when the determined size of one of the communication frame and the at least one data payload is above a predetermined threshold.

In yet one more aspect, a computer program product comprising computer-readable medium is disclosed. The computer-readable medium comprises code for causing a computer to determine a size of one of a communication frame for use in a wireless communication system and at least one data payload in the wireless communication frame. The computer-readable medium also includes code for causing a computer to format the communication frame to include headers at the beginning of the frame prior to any corresponding data payloads in the frame when the determined size of one of the communication frame and the at least one data payload is above a predetermined threshold.

DETAILED DESCRIPTION

In an aspect, the presently disclosed methods and apparatus provide frame formatting that engenders optimized processing for frames received at a mobile device, such as an access terminal (AT), for instance. This is accomplished through a frame format that arranges headers at the beginning of a wireless communication frame prior to the payload packets, particularly for frames having large payload packets, and thus larger frame size. When processed at a receiver, such formatting affords more efficient processing than frames arranged where each header is placed with its associated payload. In another aspect, the presently disclosed methods and apparatus provide frame formatting that is dependent on either the overall size of the communication frame (e.g., a MAC Frame) or the size of payload packets within a particular communication frame. If the frame or the payload packets in a frame are smaller, such as for VoIP communications, the headers are arranged in conjunction with their associated payload packet in order to optimize the header size. On the other hand, if the communication frame or the payload packets within the frame are large, such as for high throughput data communications, such as UMB or LTE, the frames are alternately arranged to include all headers up front in the frame prior to the payload packets in order to optimize the ability of a receiver processing the frame. In this manner, the frame formatting is tailored to be most optimal for the type of communication effected with the frame.

In the following described examples, for reasons of conciseness and clarity the disclosure uses some terminology associated with Ultra Mobile Broadband (UMB) technology. It should be emphasized, however, that the presently described examples are also applicable to other technologies, such as technologies related to Long Term Evolution (LTE), Code Division Multiple Access (CDMA), cdma2000 EV-DO, Time Division Multiple Access (TDMA), Frequency Division Multiple Access (FDMA), Orthogonal Frequency Division Multiple Access (OFDMA) and so forth. It will be appreciated by those skilled in the art, that when applying the disclosed methods and apparatus to other technologies, the associated terminology would clearly be different.

As examples, an access point (AP) may be a fixed station used for communicating with the terminals and may also be referred to as an access point, a Node B, base station, or some other terminology. An access terminal (AT) may also be called an access terminal (AT), user equipment (UE), a wireless communication device, terminal, access terminal or some other terminology.

Figure 1:
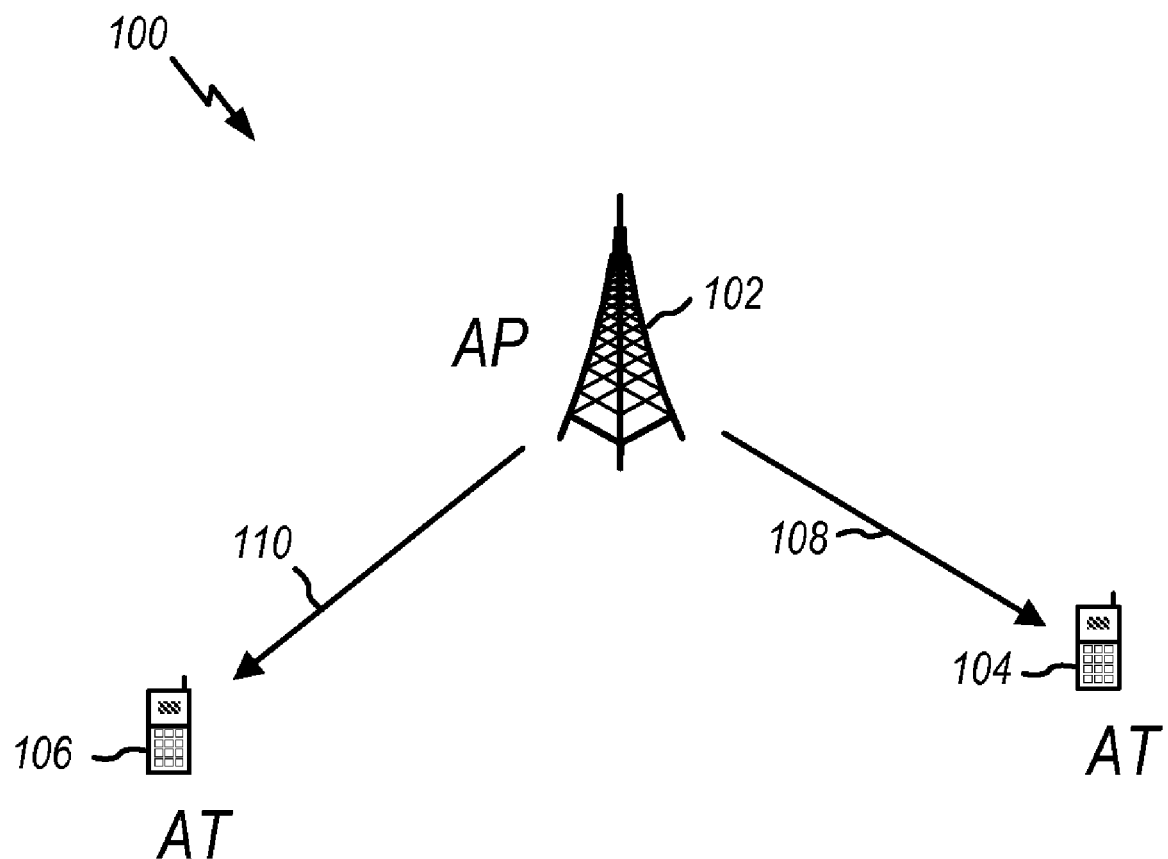
FIG. 1 illustrates a wireless communication system 100 in which the presently disclosed methods and apparatus may be employed.

According to an aspect, FIG. 1 illustrates a wireless communication system 100 in which the presently disclosed methods and apparatus may be employed. An access point (AP) or base station 102 transmits information to access terminals 104 over forward links 106, 108. The transmitted information may be arranged in communication frames to packetize the data.

An access point (AP) may be a fixed station used for communicating with the terminals and may also be referred to as an access point, a Node B, or some other terminology. An access terminal (AT) may also be called an access terminal, user equipment (UE), a wireless communication device, terminal, access terminal or some other terminology.

Figure 2:
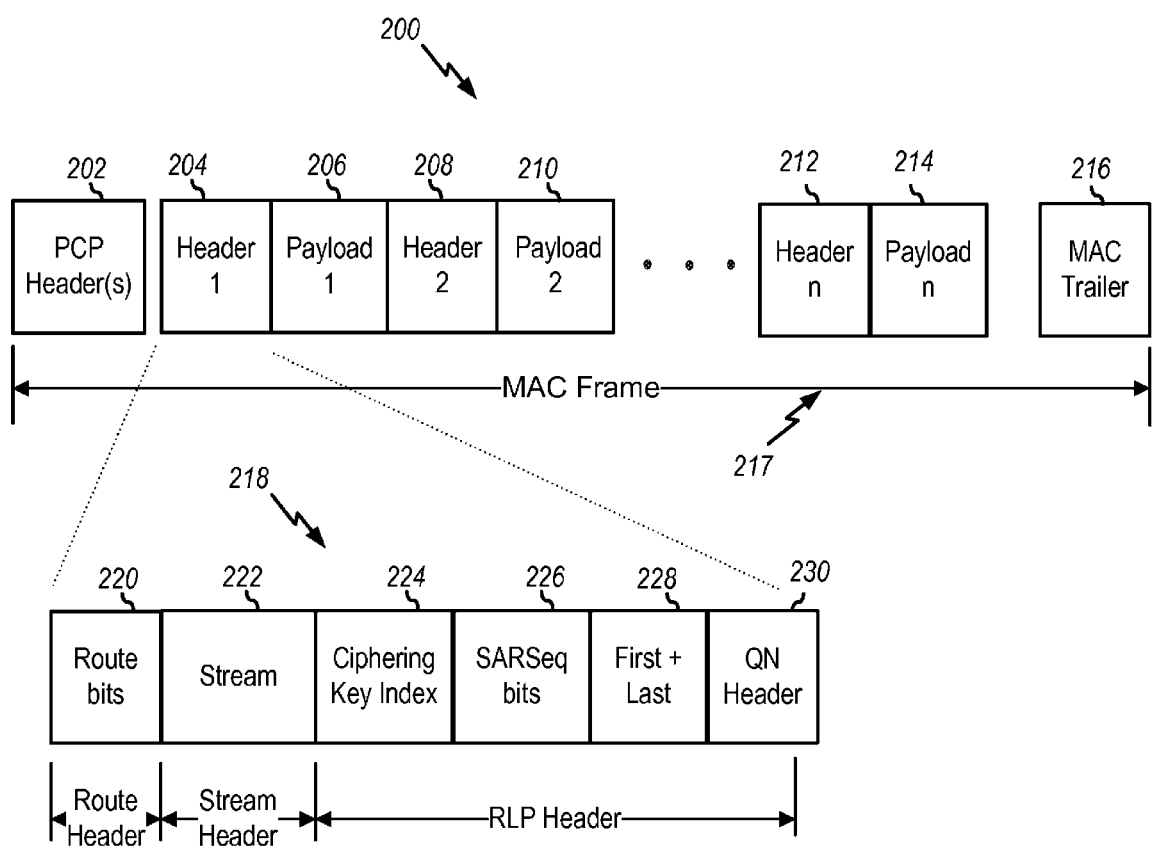
FIG. 2 illustrates an exemplary media access control (MAC) layer frame formatting for header optimization that may be transmitted in a UMB system of FIG. 1.

FIG. 2 illustrates an exemplary media access control (MAC) layer (and above) frame formatting that may be transmitted with AP 102 in the system of FIG. 1, for example. Frame 200, in particular, is exemplary of a UMB format for header optimization, such as for smaller payload packets. As discussed above, VoIP communication utilizes smaller payload packets, but frame 200 is not limited solely to such, and is optimal with various other types of communications which are timing sensitive in manner similar to voice communications. As illustrated, the MAC frame 200 includes a one or more frame headers 202 (shown singular for brevity) for each packet within the frame 200. Headers 202 are referred to as a Packet Consolidation Protocol (PCP) headers, are arranged first in the frame 200, and serve to indicate where to find the various n number of data packets within the communication frame 200. After header 202, a first header 204 is shown placed immediately prior to an associated or corresponding data payload 206. The headers, as will be explained later, may be configured according to Radio Link Protocol, Stream Protocol, fragmentation and reassembly protocol, or logical channel identification protocol, as examples. The pair of the header and payload, such as header 204 and payload 206, may be termed as a "packet", and more specifically a MAC packet in the present example.

After payload 206, a next header 208 and an associated payload 210 come in sequential order through an $n^{th}$ header 212 and associated data payload or packet 214. After the header and data payload pairs, a trailer 216 for MAC frame 200 may be included to delineate or signal an end of the frame 200, or at least the end of the n number of data payloads within the frame 200. The overall size of the frame 200 is illustrated in FIG. 2 by the dimension 217.

FIG. 2 also illustrates an expanded or blown up view 218 of an exemplary upper layer header that is applicable to all headers of frame 200, such as header 204. As may be seen, header 218 includes a number of fields, some of which are variable in bit length and dependent of the size of the payload or data packet to which it corresponds. Accordingly, this allows the header to be varied according to the particular size of the data payload or the packet.

As illustrated, header 218 may include a Route Header 220, which has Route bits of variable bit length to indicate destination route of the packet. Header 218 may also include Stream Header 222 to indicate a stream corresponding to this packet. Additionally, the header 218 includes a radio link protocol (RLP) header that includes a Ciphering Key Index 224, a SAR (Segmentation and Reassembly) Sequence field 226, First+Last filed 228, and a Quick Nak (QN) header 230. The RLP header is derived or obtained from another layer than the MAC layer and added to the header 218. Various fields in the RLP header may also be variable based on the packet size, such as the SARSeq field 226 or the QN Header 230. It is noted that the RLP header is derived from other layers (e.g., RLP layer or when assembling the headers for the MAC layer frame 200.

It is also noted that the PCP header 202 may also be formatted to include information fields (not shown) to indicate if more than one PCP header is present in the frame 200. The PCT header 202 may also include short or long length field that used to indicate expanded payload lengths in the case of a long field to support larger Segmentation and Reassembly Protocol Data Unit (SAR PDU) payload sizes. As an example, the length field in the PCP header may be 6 bits in length to indicate shorter payload lengths up to 64 bytes and a length field of 14 bits to indicate large payload lengths of up to 16,384 bytes.

Figure 3:
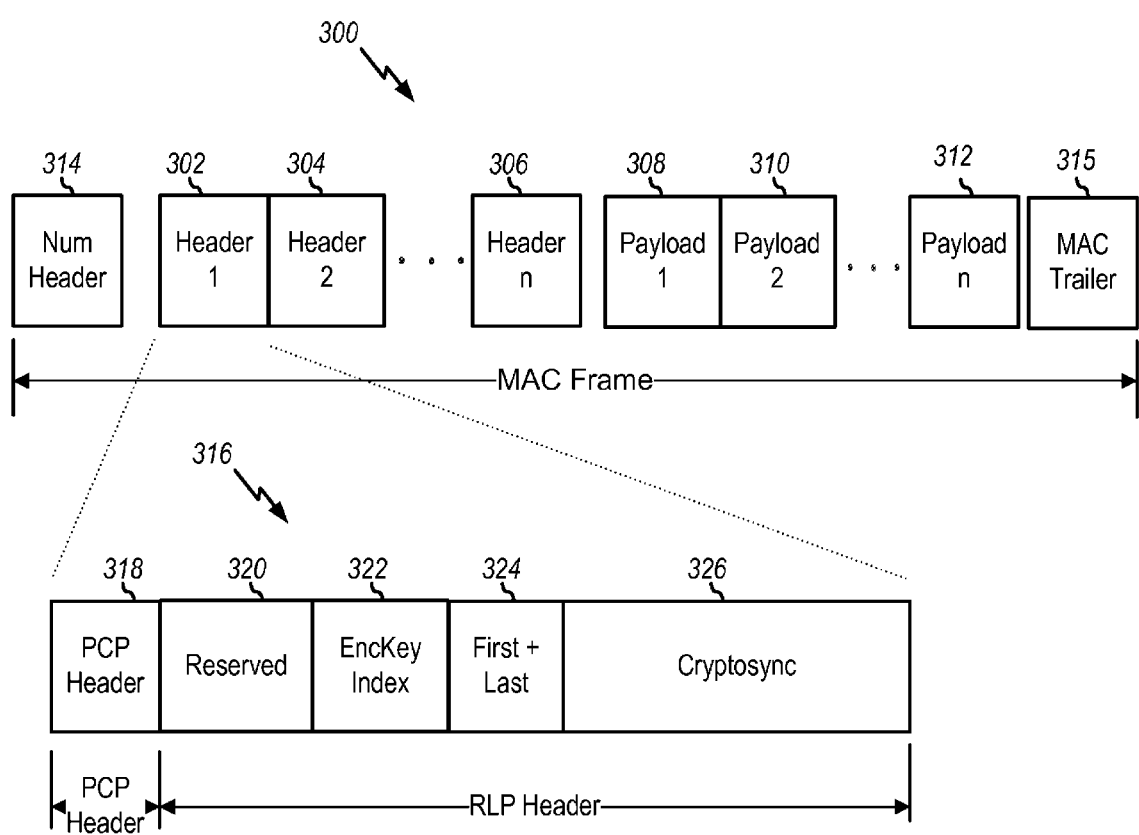
FIG. 3 illustrates an alternate exemplary media access control (MAC) layer frame formatting for processing optimization that may be transmitted in a UMB system.

FIG. 3 illustrates an alternative exemplary media access control (MAC) layer (and above) frame formatting that may be transmitted with AP 102 in the system of FIG. 1, for example. In particular, the frame 300, which is a MAC layer frame for a UMB system in this example, is arranged or formatted to afford optimized processing by a receiver receiving and processing the frame. As may be seen in FIG. 3, the frame 300 includes an n number of headers (302, 304, through 306) arranged at the beginning of frame 300 prior to their corresponding payloads (308, 310, 312). As has been discovered by the present inventors, this arrangement of the headers and payloads within a communication frame, such as frame 300, has proven to optimize processing at a receiver demodulating and decoding the frame.

Frame 300 may also include a Number of Headers packet 314 at the beginning of the frame (e.g., a one byte field indicating the number of data packets in the frame 300). The packet 314 communicates the number of header packets (i.e., n number) within the frame 300. Frame 300 also includes a MAC trailer 315 that ends the frame 300.

Also illustrated in FIG. 3 is an expanded view 316 of a typical header, such as header 302. As illustrated by view 316, the header includes a PCP header 318 that may be used to communicate PCP information from another layer, as well as route header information. The header also may included an RLP header having a reserved field 320, Encryption Key Index field 322, First+Last field 324, and a Cryptosync field 326. Furthermore, within the Cryptosync filed, various bits (not shown) may be used to indicate a Function code, direction, a router counter, a stream ID, a SAR Reset Counter, and a virtual SAR Sequence number. It is noted that in an example that the Cryptosync may be set to 96 bits in length.

Additionally, according to an aspect, the length of the headers in frame 300 may be set to a fixed size to enhance optimization of processing by a receiver. By fixing the size of the header, processing at the receiver is further optimized as a fixed size affords predictability for the processing receiver and serves to prevent bottlenecks in the processing by a receiver. The particular length of the headers may be set according to the particular system or type of communication being effected with the communication frame.

Figure 4:
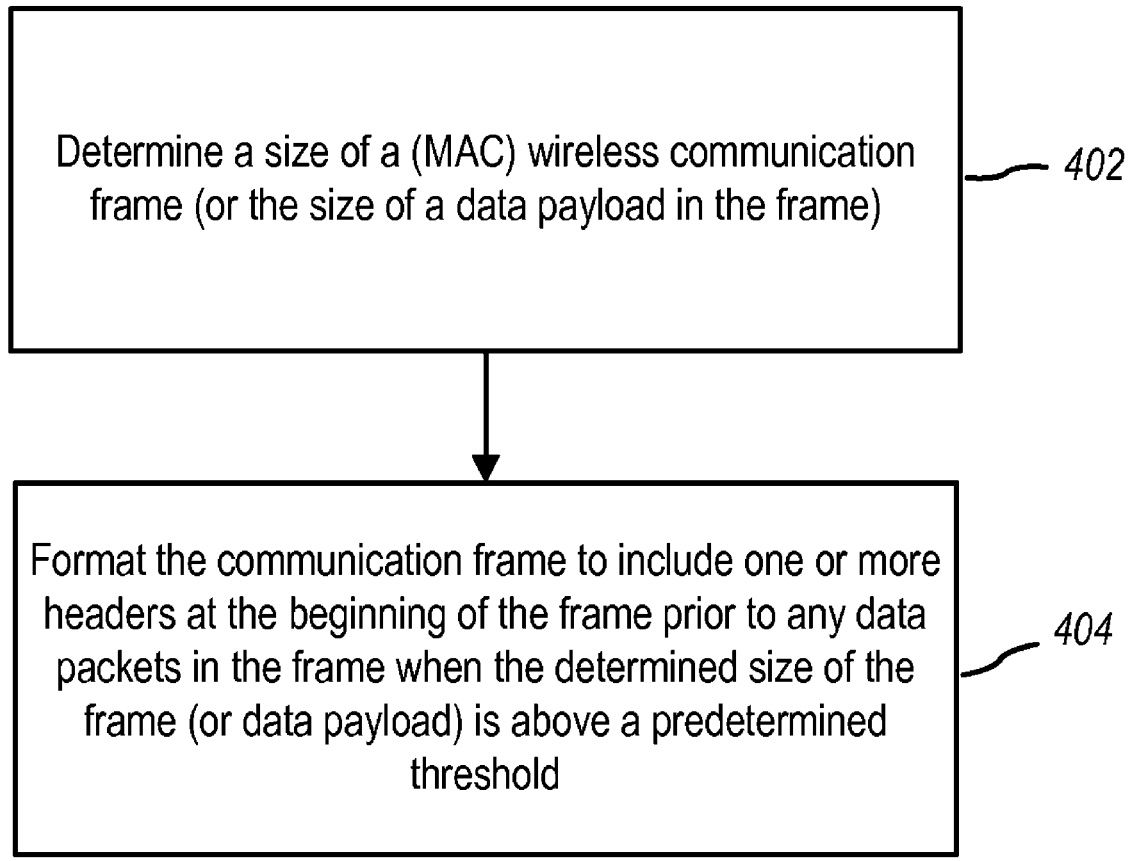
FIG. 4 illustrates a method for formatting communication frames that may be used by a base station, AP, or other transmitter of a communication system, such as UMB or LTE communication systems.

FIG. 4 illustrates a method for formatting communication frames that may be used by a base station, AP, or other transmitter of a communication system, such as UMB or LTE communication systems. As illustrated, a size of a wireless communication frame, such as a MAC frame, to be assembled is determined, as illustrated by block 402. It is noted that this size determination may be based on the total size of the wireless frame (e.g., 217), or alternatively the size determination may be based on one or more of the size(s) of data payloads in the communication frame. As another alternative, the size determination in block 402 may be based on whether the type of communication is known (e.g., broadband communication with attendant large frame size). Thus, if the communication is broadband communication, such as in UMB or LTE systems, it is known that the frame size will be large as compared to other communication such as VoIP.

According to the method of FIG. 4, the MAC frame is then assembled where a plurality of headers each corresponding to a respective MAC payload are arranged in the communication frame prior to the plurality MAC payloads when the determined size of the frame is greater than a predetermined threshold as illustrated by the process in block 404. As discussed above, by arranging all of the MAC headers before any of the MAC payloads, such as illustrated by the example of FIG. 3, processing of the communication frame may be optimized at the receiver.

Figure 5:
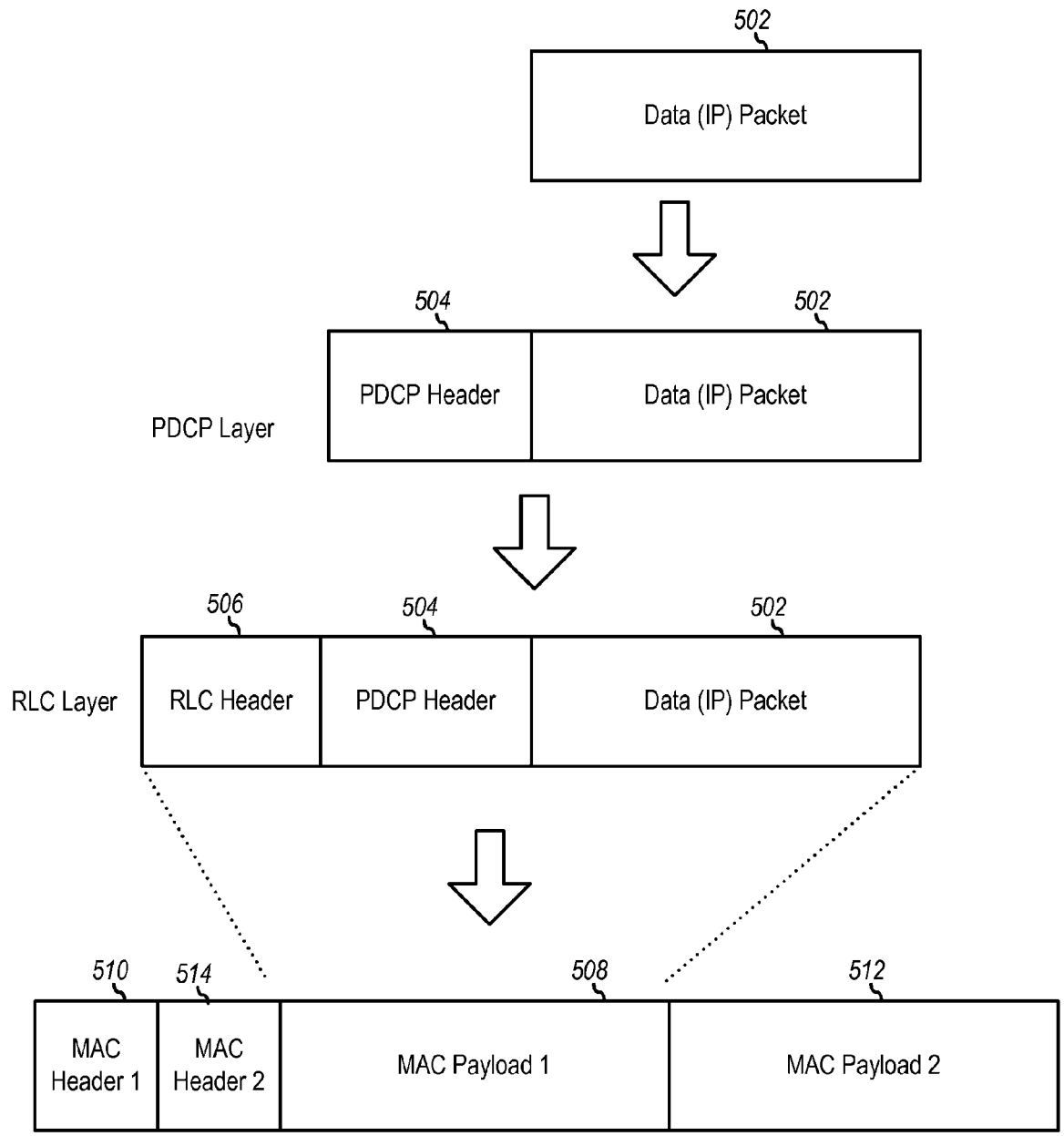
FIG. 5 illustrates an exemplary sequential series of frame assembly through multiple layers in an LTE system.

According to an alternative aspect, the size determination in block 402 may be based on determination of the size of at least one of the payloads and corresponding headers, rather than on the overall communication frame size. Accordingly, the decision to format the frame by placing headers before any payloads in block 404 would then be based on whether it is determined that at least one payload and header size is greater than a predetermined threshold As an example of a process by which the MAC payloads may be formed or assembled in the process of blocks 402 and 404, FIG. 5 illustrates a sequential series of frame assembly through multiple layers. It is noted that the terminology used in this example pertains to LTE communication systems, but the concepts are not limited to such and may be applied to UMB or any number of other suitable communication systems. As illustrated, a data packet 502, such as a data IP packet, is associated with or added with a Packet Data Convergence Protocol (PDCP) header 504 at the PDCP layer. This header 504, as an example, may include a PDCP Sequence Number (SN). In a further aspect, the SN may be 7 or 12 bits in length, dependent on the logical channel. The pairing of the data packer 502 and PDCP Header 504 may optionally include an added trailer with a security checksum (e.g., a 4 byte field).

The pairing 502, 504 is then next associated with or added to a radio link control (RLC) header 506 at a next RLC layer. Finally, the combined RLC payload consisting of the RLC header 506, PDCP header 504, and data packet 502, or multiple RLC payloads (not shown) may be then assembled for use as a MAC payload 508 at the MAC layer. As may be seen in this example, the MAC payload 508, designated as MAC Payload 1, is associated with a MAC header 510. As further illustrated, a MAC Payload 2 (512) is also placed in a communication frame with an associated MAC Header 2 (514), which is located prior to the MAC payloads (508, 512).

Figure 6:
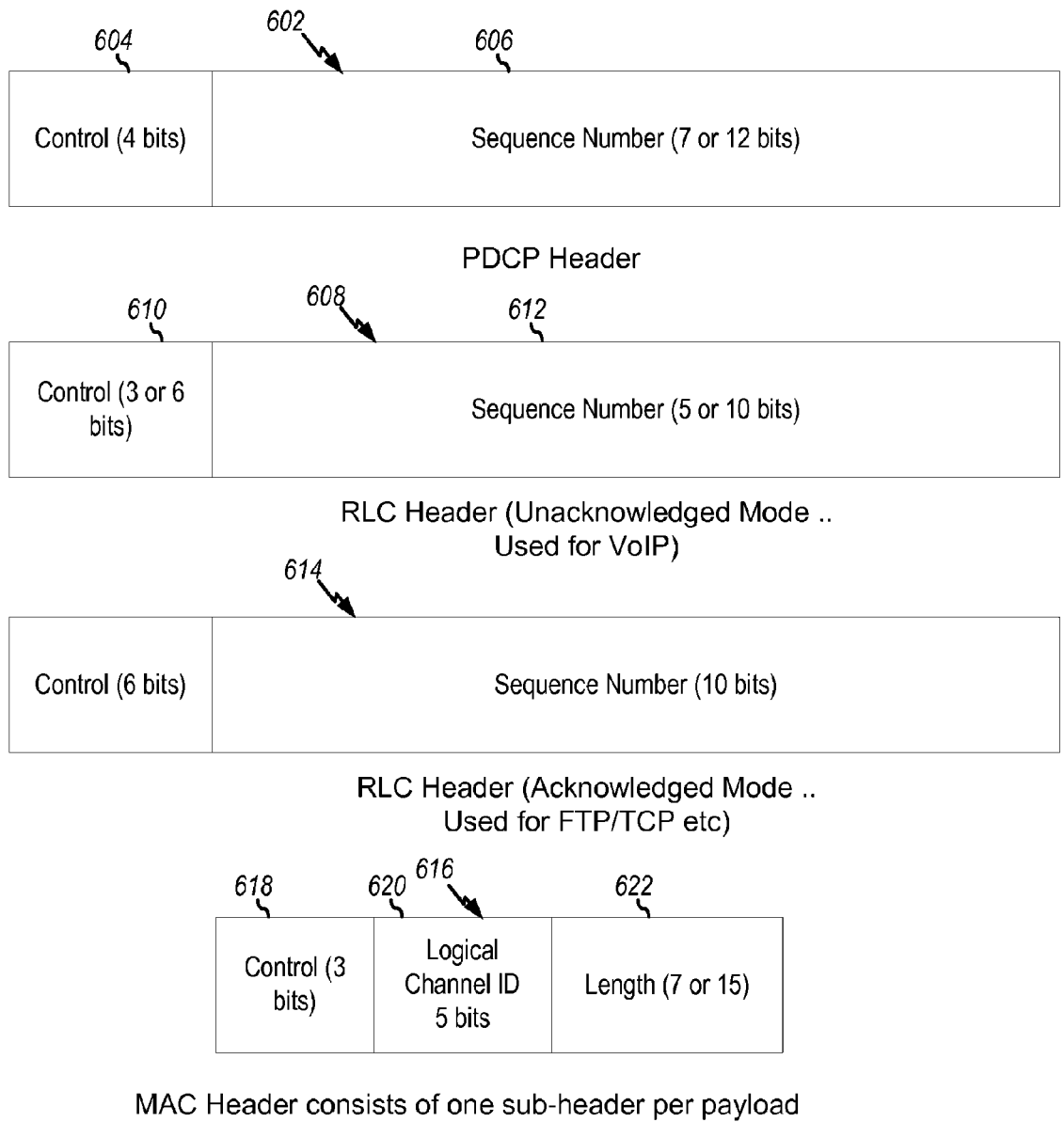
FIG. 6 illustrates exemplary headers that may be used for the headers of the various layers illustrated in FIG. 5.

FIG. 6 illustrates exemplary headers that may be used for the headers of the various layers illustrated in FIG. 5. Again, as in FIG. 5, the terminology used in this example pertains to LTE communication systems, but the concepts are not limited to such and may be applied to UMB or any number of other suitable communication systems. As illustrated, a PDCP Header 602 includes a control field 604 of 4 bits and a sequence number field 606 having either 7 or 12 bits. An RLC Header 608 particular to a mode such as Unacknowledged Mode or VoIP, may include a control field 610 having 3 or 6 bits, and sequence number field 612 of 5 or 10 bits. Another alternative for an RLC header for an Acknowledged Mode such as FTP/TCP, is shown by header 614 having a control field of 6 bits and a sequence number of 10 bits.

A MAC header 616 may consist of a control field 618 having 3 bits, a logical channel ID field 620 that is 5 bits in length, and a Length field 622 of 7 or 15 bits. Additionally, the size of the headers may be fixed for larger data packet sizes. Thus, in the example of FIG. 6, the RLC sequence number 606 would be set at 10 bits, the PDCP sequence number 604 set at 12 bits, and the MAC header length filed 622 at 15 bits.

According to another aspect, the formatting of communication frames may be made dependent on the size of the payload data packets in order to optimize the formatting for communication types. When the payload frames are small, such as in VoIP communications, the communication frame may be formatted to first format, such as a format to optimize header sizing. Conversely, when payloads are large, such as in high throughput communications, the communication frame may be alternatively formatted to another format, such as a format to optimize processing of the frame at a receiver.

Figure 7:
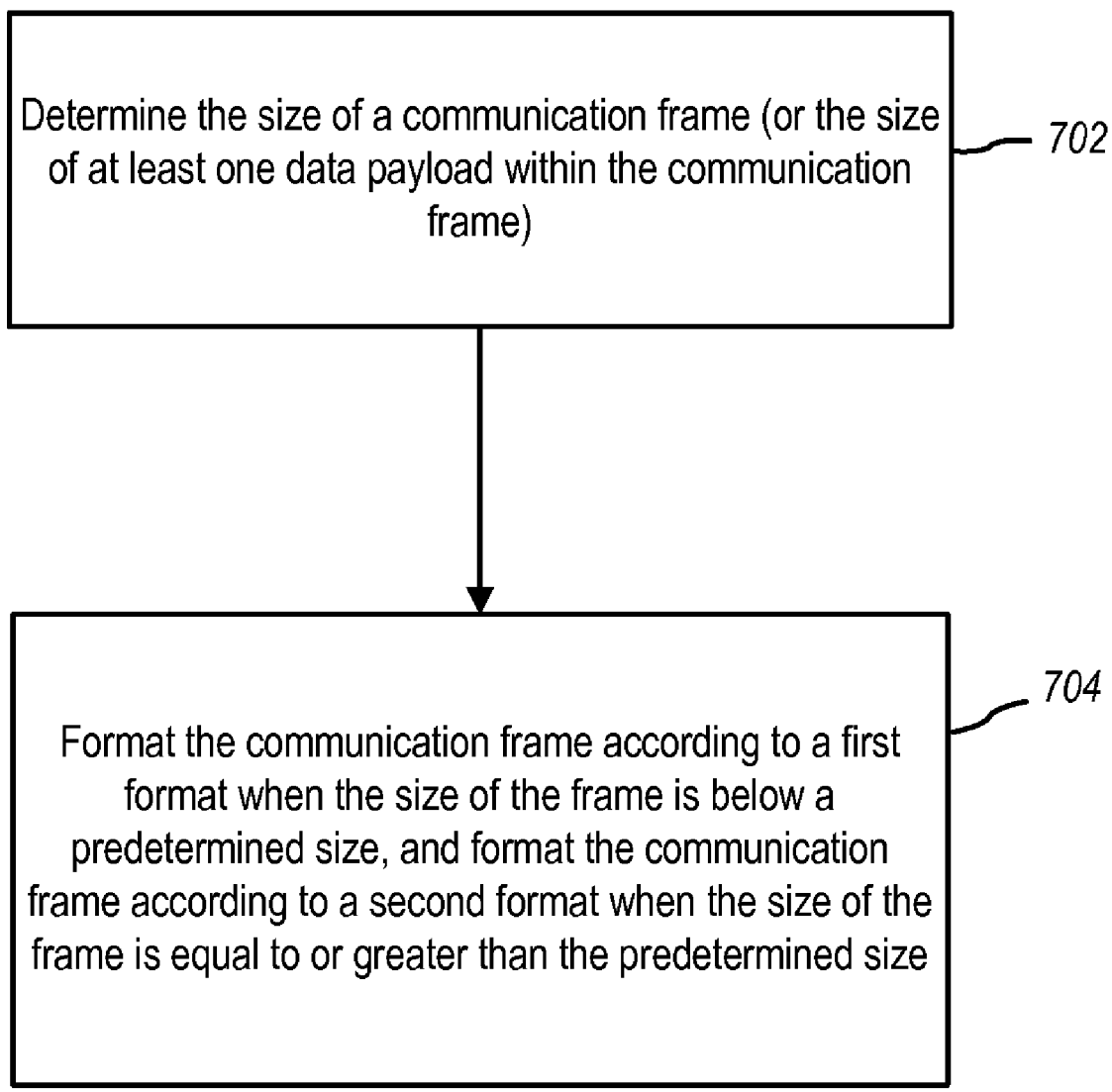
FIG. 7 illustrates a flow chart of such an exemplary method for use in formatting the header configuration in a communication frame dependent on the payload or data packet size.

FIG. 7 illustrates a flow chart of such an exemplary method for use in formatting the header configuration in a communication frame dependent on the size of the communication frame. As shown, the size of the communication frame to be formatted is determined in block 702. After determination of the size of the communication, flow proceeds to block 704. At block 704 at least one header corresponding to the at least one data packet is formatted according to a first format when the size of the packet is below a predetermined size and according to a second format when the size of the packet is equal to or greater than the predetermined size. The predetermined size is dependent on the communication system and attendant standards. As merely an example, clearly large packets on the order to 4000-6000 bytes in UMB or LTE communications would be above the predetermined threshold, whereas much smaller VoIP packets of 40-50 bytes would be well below the predetermined threshold.

According to an aspect, the first format may include variably configuring the size of the at least one header based on a length of the corresponding at least one data packet. As an example from FIG. 2, the header 218 in a header optimized format utilizes various variable length fields, such that the header may be sized or tailored based on the size of the data packet. This variability affords the ability to ensure that the header size is optimized to be as small as possible for a given data packet.

Additionally, the first format of block 704 may also include grouping the at least one header with the corresponding at least one data packet within the communication frame, as illustrated by the example of frame 200 in FIG. 2, which is suited for particular types of communication such as voice over IP communications.

According to another aspect, the second format in block 704 may include placing the at least one header in the communication frame prior to and independent from the corresponding at least one data packet. That is, each header corresponding to a data packet is separated or made independent from the data packet and placed prior to the data packets or payloads in the communication frame. An example of this formatting is illustrated by MAC frame 300 in FIG. 3. By separating the headers from their associated payloads or data packets, especially in the case of large data packets used in data communications (e.g., TCP/IP), a resultant benefit is more efficient processing of the communication frame at a receiver, as header processing may be begin while waiting to receive the actual payloads that will be demodulated and decoded.

In an example of the second format in block 704, the size of the at least one header may be set to at a prescribed fixed length, such as was discussed above in connection with the example of the MAC header in FIG. 5. By setting the headers to a fixed length, a benefit of predictability afforded to the receiver. When the size of each header is known to the receiver, less processing is required to determine how many bits will be present in header, thereby contributing to further optimization of processing.

According to still another aspect of the second format in block 704, the header format of the second information used by a receiver of the communication frame for ciphering or processing the at least one data packet is contained within the at least one header. As an example of this feature, FIG. 3 illustrates that the header 316 includes the PCP header 318 within each header such that the PCT and Route information is contained within each respective header. Accordingly, processing of the headers may be optimized and the headers themselves may be independent from other headers, and more importantly, their corresponding data packets. This is in contrast to the header optimized format of FIG. 2, where the PCP headers 220 are separate from the headers (e.g., 202) and are processed prior to processing of the grouping of headers and data packets.

Figure 8:
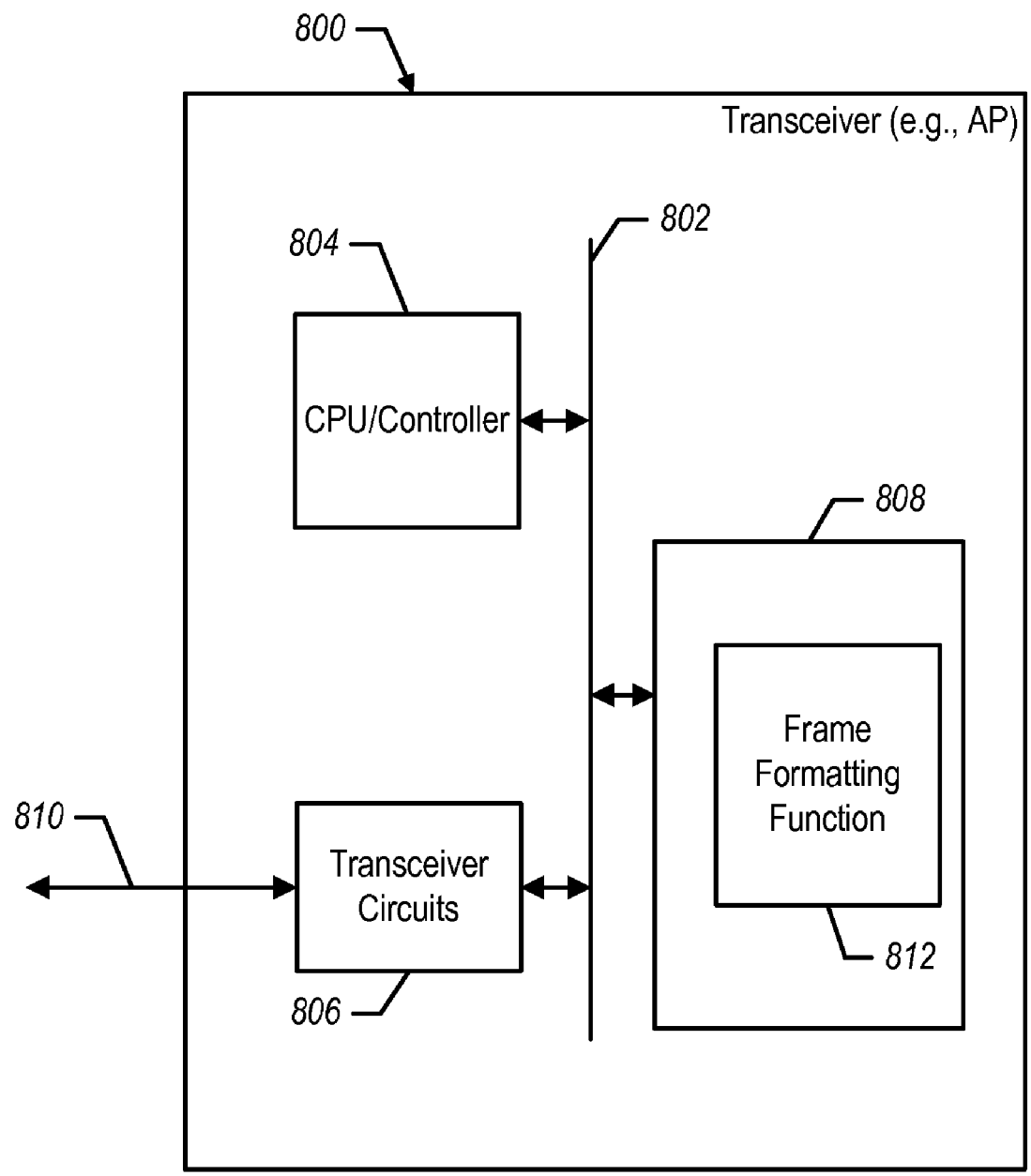
FIG. 8 illustrates an exemplary transceiver that formats and transmits the communication frames based on packet data size in accordance with the disclosed formats and methods.

FIG. 8 illustrates an exemplary transceiver 800 that formats and transmits the communication frames based on packet data size in accordance with the formats and methods disclosed herein. Transceiver 800 may constitute an AP (e.g., AP 102 in FIG. 1), a base station, or other suitable hardware (e.g., processor, or a collection of circuits/modules), software, firmware, or any combination thereof for use in an AP device. As illustrated, transceiver 800 includes a central data bus 802, or similar device for communicatively linking or coupling several circuits together. The circuits include a CPU (Central Processing Unit) or a controller 704, transceiver circuits 806, and a memory unit 808.

The transceiver circuits 806 include receiver circuits to process received signals before sending out to the central data bus 802, as well as transmit circuits to process and buffer data from the data bus 802 before sending out of the device 800, such as to one or more ATs as illustrated by wireless communication link(s) 810. Accordingly, the transceiver circuits 806 may include RF circuits to transmit over the wireless link 810 to the one or more ATs.

The CPU/controller 806 performs the function of data management of the data bus 802 and further the function of general data processing, including executing the instructional contents of the memory unit 808. It is noted here that instead of separately implemented as shown in FIG. 8, as an alternative, the transceiver circuits 706 can be incorporated as parts of the CPU/controller 704. As a further alternative, the entire apparatus 700 may be implemented as an application specific integrated circuit (ASIC) or similar apparatus.

The memory unit 808 may include one or more sets of instructions/modules. In the exemplary apparatus 800, the instructions/modules include, among other things, a frame formatting function 812, which is configured to effect the methodologies described herein; namely the frame formatting discussed above in connection with FIGS. 2-7. In the example of FIG. 8, the memory unit 808 may be a RAM (Random Access Memory) circuit. The exemplary portions, such as the functions in block 812, are software routines, modules and/or data sets. The memory unit 808 can be tied to another memory circuit (not shown) which either can be of the volatile or nonvolatile type. As an alternative, the memory unit 808 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and other computer-readable media well known in the art.

Figure 9:
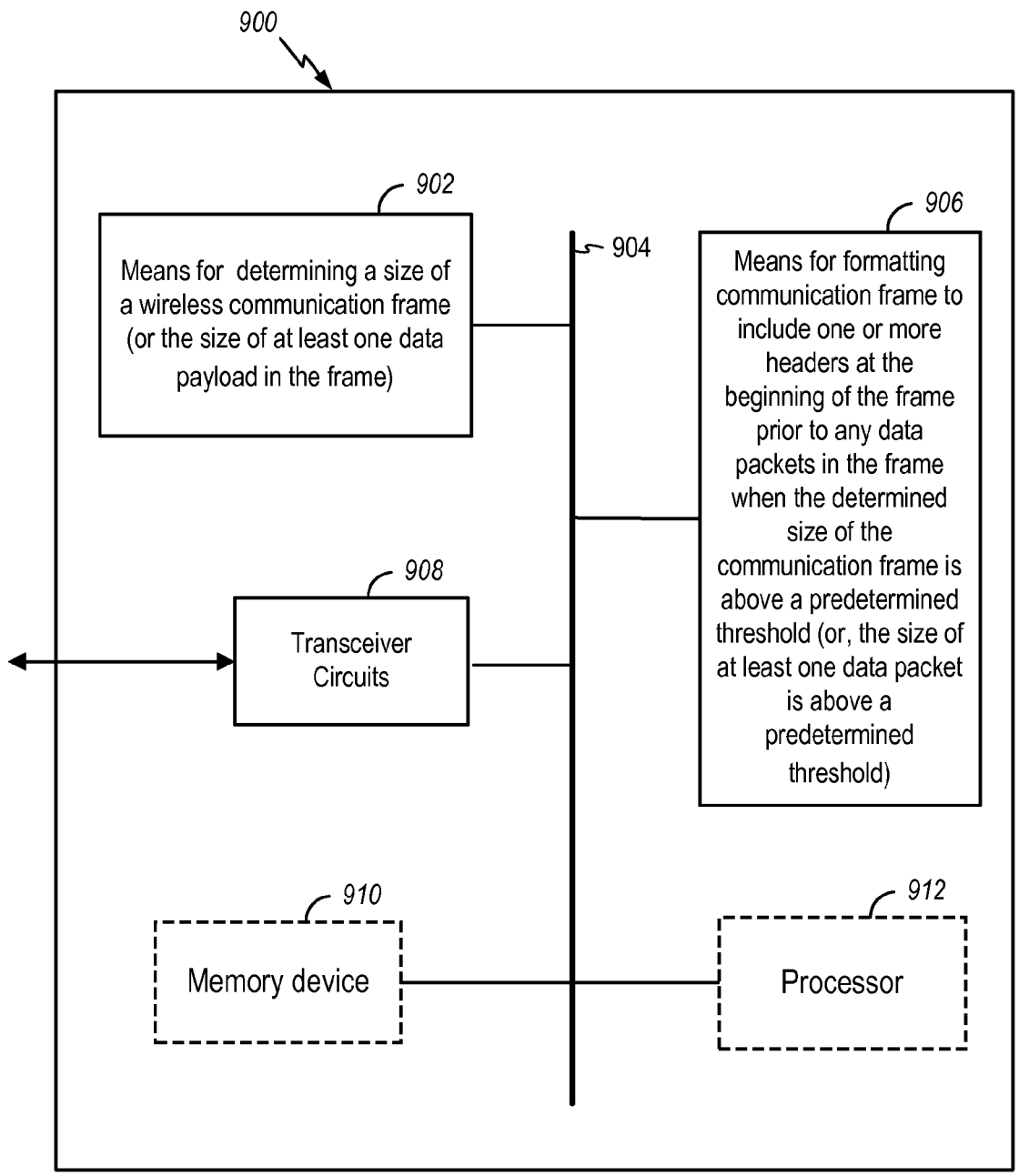
FIG. 9 illustrates a further example of an apparatus for use in a transceiver in a communication system that may be utilized for formatting headers in communication frames.

FIG. 9 illustrates a further example of an apparatus for use in a transceiver in a communication system that may be utilized for formatting headers in communication frames. It is noted that the apparatus 900, may be implemented in an AP or base station, as examples. It should be further noted, that disclosed apparatus 900 is not limited to implementation only in an AP or base station, but also any suitable apparatus that formats communication frames for transmission.

Apparatus 900 includes a module or means 902 for determining a size of a wireless communication frame (or alternatively the size of one or more data payloads within the communication frame). As an example, means 902 may be implemented with one or more components within a transceiver. As an example from FIG. 8, the memory 810 in conjunction with CPU/Controller 804 may effect means 902. The information determined by means 902 may then be communicated to various other modules or means in apparatus 900 via a bus 904, or similar suitable communication coupling.

Apparatus 900 also includes a means 906 for formatting the communication frame to include one or more headers at the beginning of the frame prior to any data packets in the frame when the determined size of the wireless communication frame is above a predetermined threshold. Alternatively, means 906 may determine that a size of one or more data payloads is above a predetermined threshold in order to decide whether to format the headers at the beginning of a frame. It is noted that means 906 may implement the processes of block 404 and the formatting shown in FIG. 3 or 5, as examples. Similar to means 902 above, means 906 may be implemented with one or more components within a transceiver, and more specifically by those that effect assembly or organization of communication frames, particularly MAC frames. As an example from FIG. 8, the memory 810 in conjunction with CPU/Controller 804 may effect means 906. Means 906 may communicate with transceiver circuits 908 to effect transmission of communication frames having the desired formatting performed by means 906.

In addition, apparatus 900 may include an optional computer readable medium or memory device 910 configured to store computer readable instructions and data for effecting the processes and behavior of one or more of the modules in apparatus 900. Additionally, apparatus 900 may include a processor 912 configured to execute the computer readable instructions in memory 910, and thus may be configured to execute one or more functions of the various modules in apparatus 900.

Figure 10:
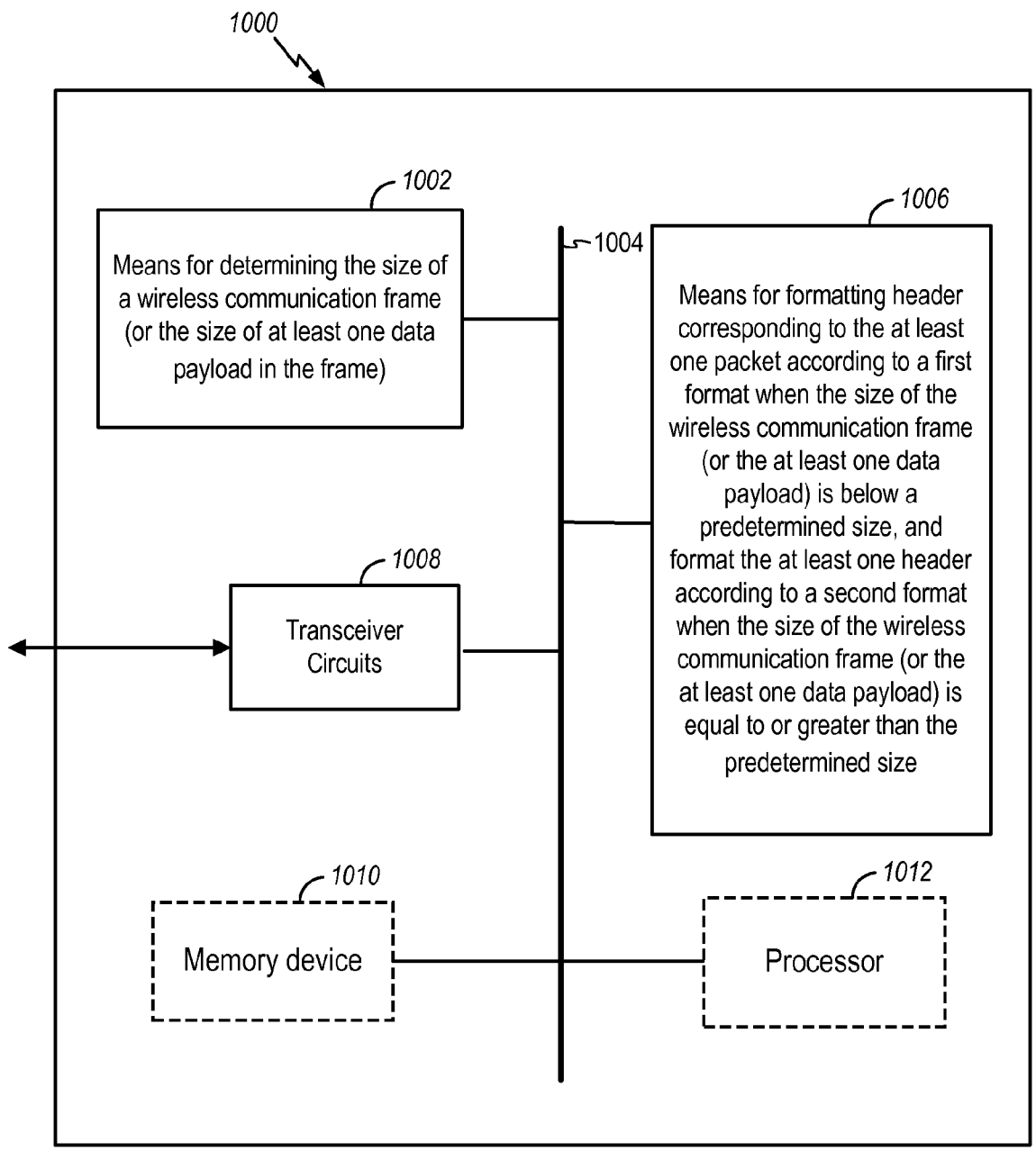
FIG. 10 illustrates a still further example of an apparatus for use in a transceiver in a communication system that may be utilized for formatting headers in communication frames.

FIG. 10 illustrates a still further example of an apparatus 1000 for use in a transceiver in a communication system that may be utilized for formatting headers in communication frames. It is noted that the apparatus 1000, may be implemented in an AP or base station, as examples. It should be further noted, that disclosed apparatus 1000 is not limited to implementation only in an AP or base station, but also any suitable apparatus that formats communication frames for transmission.

Apparatus 1000 includes a module or means 1002 for determining a size of MAC wireless communication frame. In an alternative aspect, the size of one or more data payloads to be placed in the communication frame may be determined by means 1002. As an example, means 1002 may be implemented with one or more components within a transceiver. As an example from FIG. 8, the memory 810 in conjunction with CPU/Controller 804 may effect means 1002. The information determined by means 1002 may then be communicated to various other modules or means in apparatus 1000 via a bus 1004, or similar suitable communication coupling.

Apparatus 1000 also includes a means 1006 for formatting header corresponding to the at least one packet according to a first format when the size of the MAC wireless communication frame is below a predetermined size, and format the at least one header according to a second format when the size of the packet is equal to or greater than the predetermined size. It is noted that means 1006 may implement the processes of block 704 in FIG. 7 and the formatting shown in both FIG. 2 and FIG. 3 or 5, as examples, dependent on the size of the communication frame. Also, means 1006 may alternatively be configured to decide formatting based on whether a size of one or more data payloads in a frame is either above or below a predetermined threshold. Similar to means 1002 above, means 1006 may be implemented with one or more components within a transceiver, and more specifically by those that effect assembly or organization of communication frames, particularly MAC frames. As an example from FIG. 8, the memory 810 in conjunction with CPU/Controller 804 may effect means 1006. Means 1006 may communicate with transceiver circuits 1008 to effect transmission of communication frames having the desired formatting performed by means 1006.

In addition, apparatus 1000 may include an optional computer readable medium or memory device 1010 configured to store computer readable instructions and data for effecting the processes and behavior of one or more of the modules in apparatus 1000. Additionally, apparatus 1000 may include a processor 1012 configured to execute the computer readable instructions in memory 1010, and thus may be configured to execute one or more functions of the various modules in apparatus 1000.

In light of the above discussion, it can be appreciated that the presently disclosed methods and apparatus afford formatting of headers in a communication frame that improves processing time for frames having large payloads. Additionally, the present disclosed methods and apparatus afford a selective optimizing of communication frames for header minimization or processing efficiency based on the payload sizes.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, means, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

The invention claimed is:

1. A method for formatting headers for data payloads within a wireless communication frame for use in a wireless communication system, the method comprising:
   determining the size of the wireless communication frame; and
   formatting headers and corresponding data payloads according to a first format within the frame when the size of the frame is below a predetermined size and according to a second format within the frame when the size of the frame is equal to or greater than the predetermined size, wherein, according to the first format, at least one data payload is positioned intermediate two headers within the frame and wherein, according to the second format, each of a plurality of headers of the frame are included in the frame prior to any of a plurality of data payloads within the frame.

2. The method as defined in claim 1, wherein the first format comprises:
   variably configuring the size of each of the headers within the wireless communication frame based on a length of a corresponding data payload.

3. The method as defined in claim 1, wherein the first format comprises:
   grouping each of the header with a corresponding data payload into a packet within the communication frame.

4. The method as defined in claim 1, wherein the first format is used for voice over IP communication.

5. The method as defined in claim 4, wherein the second format further comprises:
   setting the size of the headers at a prescribed fixed length.

6. The method as defined in claim 4, wherein all information used by a receiver of the communication frame for processing the data payloads is contained within the respective corresponding headers.

7. The method as defined in claim 1, wherein the communication frame is a Media Access Control (MAC) layer frame, the headers are MAC headers, and the data payloads are MAC data payloads.

8. The method as defined in claim 1, wherein the wireless communication system is one of an Ultra Mobile Broadband (UMB) and a Long Term Evolution (LTE) communication system.

9. An apparatus for formatting headers for data payloads within a wireless communication frame for use in a wireless communication, the apparatus comprising:
   at least one processor configured to:
      determine the size of the wireless communication frame; and
      format headers and corresponding data payloads according to a first format within the frame when the size of the frame is below a predetermined size and according to a second format within the frame when the size of the frame is equal to or greater than the predetermined size, wherein, according to the first format, at least one data payload is positioned intermediate two headers within the frame and wherein, according to the second format, each of a plurality of headers of the frame are included in the frame prior to any of a plurality of data payloads within the frame;

a memory coupled to the at least one processor.

10. The apparatus as defined in claim 9, wherein the first format comprises:
variably configuring the size of each of the headers within the wireless communication frame based on a length of a corresponding data payload.

11. The apparatus as defined in claim 9, wherein the first format comprises:
grouping each of the header with a corresponding data payload into a packet within the communication frame.

12. The apparatus as defined in claim 9, wherein the first format is used for voice over IP communication.

13. The apparatus as defined in claim 9, wherein the second format further comprises:
setting the size of the headers at a prescribed fixed length.

14. The apparatus as defined in claim 9, wherein all information used by a receiver of the communication frame for processing the data payloads is contained within the respective corresponding headers.

15. The apparatus as defined in claim 9, wherein the communication frame is a Media Access Control (MAC) layer frame, the headers are MAC headers, and the data payloads are MAC data payloads.

16. The apparatus as defined in claim 9, wherein the wireless communication system is one of an Ultra Mobile Broadband (UMB) and a Long Term Evolution (LTE) communication system.

17. An apparatus for formatting headers within a communication frame for use in a wireless communication system, the apparatus comprising:
means for determining the size of the wireless communication frame; and
means for formatting headers and corresponding data payloads according to a first format within the frame when the size of the frame is below a predetermined size and according to a second format within the frame when the size of the frame is equal to or greater than the predetermined size, wherein, according to the first format, at least one data payload is positioned intermediate two headers within the frame and wherein, according to the second format, each of a plurality of headers of the frame are included in the frame prior to any of a plurality of data payloads within the frame.

18. The apparatus as defined in claim 17, wherein the first format comprises:
variably configuring the size of each of the headers within the wireless communication frame based on a length of a corresponding data payload.

19. The apparatus as defined in claim 17, wherein the first format comprises:
grouping each of the header with a corresponding data payload into a packet within the communication frame.

20. The apparatus as defined in claim 17, wherein the first format is used for voice over IP communication.

21. The apparatus as defined in claim 17, wherein the second format further comprises:
setting the size of the headers at a prescribed fixed length.

22. The apparatus as defined in claim 17, wherein all information used by a receiver of the communication frame for processing the data payloads is contained within the respective corresponding headers.

23. The apparatus as defined in claim 17, wherein the communication frame is a Media Access Control (MAC) layer frame, the headers are MAC headers, and the data payloads are MAC data payloads.

24. The apparatus as defined in claim 17, wherein the wireless communication system is one of an Ultra Mobile Broadband (UMB) and a Long Term Evolution (LTE) communication system.

25. A computer program product, comprising:
a non-transitory computer-readable medium comprising:
code for causing a computer to determine the size of a wireless communication frame in a wireless communication system; and
code for causing a computer to format headers and corresponding data payloads according to a first format within the frame when the size of the frame is below a predetermined size and according to a second format within the frame when the size of the frame is equal to or greater than the predetermined size, wherein, according to the first format, at least one data payload is positioned intermediate two headers within the frame and wherein, according to the second format, each of a plurality of headers of the frame are included in the frame prior to any of a plurality of data payloads within the frame.

26. The computer program product as defined in claim 25, wherein the first format comprises:
variably configuring the size of each of the headers within the wireless communication frame based on a length of a corresponding data payload.

27. The computer program product as defined in claim 25, wherein the first format comprises:
grouping each of the header with a corresponding data payload into a packet within the communication frame.

28. The computer program product as defined in claim 25, wherein the first format is used for voice over IP communication.

29. The computer program product as defined in claim 25, wherein the second format further comprises:
setting the size of the headers at a prescribed fixed length.

30. The computer program product as defined in claim 25, wherein all information used by a receiver of the communication frame for processing the data payloads is contained within the respective corresponding headers.

31. The computer program product as defined in claim 25, wherein the communication frame is a Media Access Control (MAC) layer frame, the headers are MAC headers, and the data payloads are MAC data payloads.

32. The computer program product as defined in claim 25, wherein the wireless communication system is one of an Ultra Mobile Broadband (UMB) and a Long Term Evolution (LTE) communication system.

33. A method for formatting a communication frame used in a communication system comprising:
determining a size of one of the communication frame and at least one data payload in the wireless communication frame; and
formatting the communication frame to include each of a plurality of headers in the frame prior to any of a plurality of corresponding data payloads in the frame when the determined size of one of the communication frame and the at least one data payload is above a predetermined threshold and to include at least one data payload intermediate two headers within the frame when the determined size of the one of the communication frame and the at least one data payload is below a predetermined threshold.

34. The method as defined in claim 33, further comprising:
setting a size of the headers to a fixed predetermined size.

35. The method as defined in claim 33, wherein the communication frame is a Media Access Control (MAC) layer frame, the headers are MAC headers, and the data payloads are MAC data payloads.

36. The method as defined in claim 33, wherein the wireless communication system is one of an Ultra Mobile Broadband (UMB) and a Long Term Evolution (LTE) communication system.

37. The method as defined in claim 33, wherein the headers are configured according to one of fragmentation and reassembly protocol and logical channel identification protocol.

38. An apparatus for formatting a communication frame used in a communication system comprising:
  at least one processor configured to:
    determine a size of one of the communication frame and at least one data payload in the wireless communication frame; and
    format the communication frame to include each of a plurality of headers in the frame prior to any of a plurality of corresponding data payloads in the frame when the determined size of one of the communication frame and the at least one data payload is above a predetermined threshold and to include at least one data payload intermediate two headers within the frame when the determined size of the one of the communication frame and the at least one data payload is below a predetermined threshold;
  a memory coupled to the at least one processor.

39. The apparatus as defined in claim 38, wherein the at least one processor is further configured to set a size of the headers to a fixed predetermined size.

40. The apparatus as defined in claim 38, wherein the communication frame is a Media Access Control (MAC) layer frame, the headers are MAC headers, and the data payloads are MAC data payloads.

41. The apparatus as defined in claim 38, wherein the wireless communication system is one of an Ultra Mobile Broadband (UMB) and a Long Term Evolution (LTE) communication system.

42. The apparatus as defined in claim 38, wherein the headers are configured according to one of fragmentation and reassembly protocol and logical channel identification protocol.

43. An apparatus for formatting a communication frame used in a communication system comprising:
  means for determining a size of one of the communication frame and at least one data payload in the wireless communication frame; and
  means for formatting the communication frame to include each of a plurality of headers in the frame prior to any of a plurality of corresponding data payloads in the frame when the determined size of one of the communication frame and the at least one data payload is above a predetermined threshold and to include at least one data payload intermediate two headers within the frame when the determined size of the one of the communication frame and the at least one data payload is below a predetermined threshold.

44. The apparatus as defined in claim 43, further comprising:
  means for setting a size of the headers to a fixed predetermined size.

45. The apparatus as defined in claim 43, wherein the communication frame is a Media Access Control (MAC) layer frame, the headers are MAC headers, and the data payloads are MAC data payloads.

46. The apparatus as defined in claim 43, wherein the wireless communication system is one of an Ultra Mobile Broadband (UMB) and a Long Term Evolution (LTE) communication system.

47. The apparatus as defined in claim 43, wherein the headers are configured according to one of fragmentation and reassembly protocol and logical channel identification protocol.

48. A computer program product, comprising:
  a non-transitory computer-readable medium comprising:
    code for causing a computer to determine a size of one of a communication frame for use in a wireless communication system and at least one data payload in the wireless communication frame; and
    code for causing a computer to format the communication frame to include each of a plurality of headers in the frame prior to any of a plurality of corresponding data payloads in the frame when the determined size of one of the communication frame and the at least one data payload is above a predetermined threshold and to include at least one data payload intermediate two headers within the frame when the determined size of the one of the communication frame and the at least one data payload is below a predetermined threshold.

49. The computer program product as defined in claim 48, wherein the computer readable medium further comprises:
  code for causing a computer to set a size of the headers to a fixed predetermined size.

50. The computer program product as defined in claim 48, wherein the communication frame is a Media Access Control (MAC) layer frame, the headers are MAC headers, and the data payloads are MAC data payloads.

51. The computer program product as defined in claim 48, wherein the wireless communication system is one of an Ultra Mobile Broadband (UMB) and a Long Term Evolution (LTE) communication system.

52. The computer program product as defined in claim 48, wherein the headers are configured according to one of fragmentation and reassembly protocol and logical channel identification protocol.

* * * * *